(12) United States Patent
Colby et al.

(10) Patent No.: US 6,231,825 B1
(45) Date of Patent: May 15, 2001

(54) PRODUCTION OF SODIUM BOROHYDRIDE FROM SODIUM BOROHYDRIDE DIHYDRATE IN A FLUIDIZED BED DRYER

(75) Inventors: Richard J. Colby, Newburyport, MA (US); Lise L. Mahoney, Deerfield, NH (US); Austin L. Eiseman, Naperville, IL (US); Walter A. Richardson, Beverly, MA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/363,103

(22) Filed: Jul. 29, 1999

(51) Int. Cl.$^7$ ........................................... C01B 6/15
(52) U.S. Cl. ........................................ 423/286; 252/188.26
(58) Field of Search .................. 423/286; 252/188.26, 252/188.22, 188.1; 422/139

(56) References Cited

U.S. PATENT DOCUMENTS

| | | | |
|---|---|---|---|
| 2,963,405 | * | 12/1960 | Seemuller ........................ 252/188.26 |
| 3,795,491 | * | 3/1974 | Winiarczyk ........................... 423/286 |
| 4,360,623 | * | 11/1982 | Wade et al. ............................ 524/404 |
| 4,670,417 | * | 6/1987 | Iwasaki et al. ........................... 514/6 |
| 5,136,070 | * | 8/1992 | Bank ..................................... 556/469 |
| 5,182,046 | * | 1/1993 | Patton et al. ..................... 252/188.26 |
| 5,942,614 | * | 8/1999 | Huber .................................... 540/573 |

FOREIGN PATENT DOCUMENTS

| | | |
|---|---|---|
| 1 186 050 | 4/1970 | (EP) . |
| 2 417 470 | 9/1979 | (FR) . |

OTHER PUBLICATIONS

Perry et al, "Chemical Engineers' Handbook", Fifth Edition, TP 155 P4 pp. 20–1 thru 20–20, 20–30 thru 20–47 and 20–64 thru 20–74, (no month).*

* cited by examiner

Primary Examiner—Ngoc-Yen Nguyen
(74) Attorney, Agent, or Firm—Kenneth Crimaldi

(57) ABSTRACT

Drying sodium borohydride dihydrate particles in a flowing stream of a chemically inert drying gas results in novel nearly odor-free, dust-free sodium borohydride particles which are free flowing without the need for anti-caking or flow additives. The dihydrate particles are preferably dried in a fluidized bed formed with a flowing stream of nitrogen.

26 Claims, 2 Drawing Sheets

PRODUCTION OF SODIUM BOROHYDRIDE FROM SODIUM BOROHYDRIDE DIHYDRATE IN A FLUIDIZED BED DRYER

BACKGROUND OF THE INVENTION

1. Field of the Invention

Sodium borohydride ($NaBH_4$) is a commercial product used as a source of hydrogen, as a reducing agent and as a blowing agent for plastics. It has been produced from the reaction of sodium hydride and trimethyl borate, as described by Schlesinger in U.S. Pat. No. 2,534,533. This reaction can result in an aqueous solution from which it is necessary to first extract the sodium borohydride with a solvent, such as isopropylamine, and then separate the borohydride product from the extraction solvent. As described in U.S. Pat. No. 3,795,491 to Winiarczyk, the borohydride product can be separated from the solvent and recovered as crystals of sodium borohydride dihydrate ($NaBH_4.2H_2O$). The sodium borohydride dihydrate is then dried to remove the water of hydration and form pure solid sodium borohydride. This invention is directed to a new and improved method of drying the sodium borohydride dihydrate to remove the water of hydration therefrom and the unique sodium borohydride product thereby produced.

2. Description of Related Art

Previously, drying of the sodium borohydride dihydrate has been accomplished by controlled heating of the particles, or crystals, under vacuum. The wet particles are loaded as a batch in rotary vacuum dryers having double helical coil ribbon agitators. The dryers are evacuated to a relatively high vacuum and the particles heated by heat transfer through the agitator shaft and dryer jacket. Once the moisture content of the charge is within the desired specification, the borohydride is cooled by extracting heat through the heat transfer surfaces, and the cooled product is then removed from the dryer.

The dried borohydride is a dusty, fine powder which is very hygroscopic and prone to agglomeration. Upon its removal from the dryer, the immediate addition of an anti-caking or flow agent, typically 0.5% by weight of silica or magnesium carbonate, or the immediate mechanical compaction to a compacted product form, is necessary to prevent severe agglomeration. The need to include such additives reduces the purity of the product. Both the reduced product purity and the compacted product form can detrimentally reduce the product's solubility and reactivity.

The prior process is hampered by the difficulty of maintaining a large leak-tight vacuum system with its associated large vacuum sources, and the possibility of massive air intrusion resulting in unsatisfactory product quality. Additional product quality deficiencies result from the inconsistencies typically encountered in batch processing. The agglomerating tendency and dusty nature of the product requires special handling and/or additives which impact on the manufacturing costs and can impact on the product's desired chemical activity. Moreover, since the affiliated processing steps upstream and downstream of the subject drying step are operated as continuous processes, the operation of the drying step as a batch process requires scheduling and storage support which would not be required if it could be operated as a continuous process.

There is a need for a drying technique which alleviates the above noted problems. It is an objective of the inventive process to provide a drying technique which avoids the maintenance and mechanical requirements of a large capacity vacuum system. A further objective is the provision of a drying technique which is capable of continuous operation.

Further objectives of the present invention include providing a dried sodium borohydride product which is not as dusty, or fine, as the vacuum-dried product; and providing a dried product which is free flowing without the need for either an anti-caking/flow agent additive or for immediate compacting.

SUMMARY OF THE INVENTION

The invention is directed to the drying of sodium borohydride dihydrate particles in a rapidly flowing stream of a low moisture content, chemically-inert drying gas. The drying gas may be selected from recognized inert gases which are non-reactive with the borohydride, such as helium, argon or nitrogen. The water content of the flowing stream is maintained at a sufficiently low level to assure that the water of hydration is removed from the dihydrate. The flowing stream may be heated to a temperature which facilitates vaporization and removal of the water of hydration, but is below the temperature at which the particles it contacts melt or become chemically unstable. Preferably, the flowing drying gas stream has progressively higher temperatures as it contacts borohydride particles with progressively lower water contents. The stream of gas may flow at a sufficient velocity to suspend the borohydride particles as a fluidized bed in an upwardly flowing stream of the drying gas. Alternatively, the borohydride particles can be suspended in, and flow with, the flowing stream of the drying gas over an elongated flow path. Once the water of hydration has been removed, the borohydride particles are recovered from the flowing stream. Preferably, the drying gas is then recycled after being dehydrated and temperature conditioned. While the process may be conducted as a batch process, it is preferred that it be operated as a continuous process.

The invention is also directed to the solid sodium borohydride product produced by the new inventive process. This product is in the form of a mixture of non-agglomerating highly reactive, readily dissolved solid particles, which mixture is free flowing without the need for anti-caking or flow agents, is relatively odor-free and dust-free, with a bulk density between 20 and 28 pounds per cubic foot, and wherein the particles are generally larger than the particles produced by the previous vacuum drying process. Generally, the product comprises a mixture of particles wherein at least 80% by weight of the total particles pass a 10 mesh screen and are retained on a 60 mesh screen.

DETAILED DESCRIPTION OF THE INVENTION

According to a preferred form of our invention, sodium borohydride dihydrate particles are fluidized in a flowing stream of a drying gas for a sufficient period of time for the water of hydration to be removed therefrom.

Figure 1:
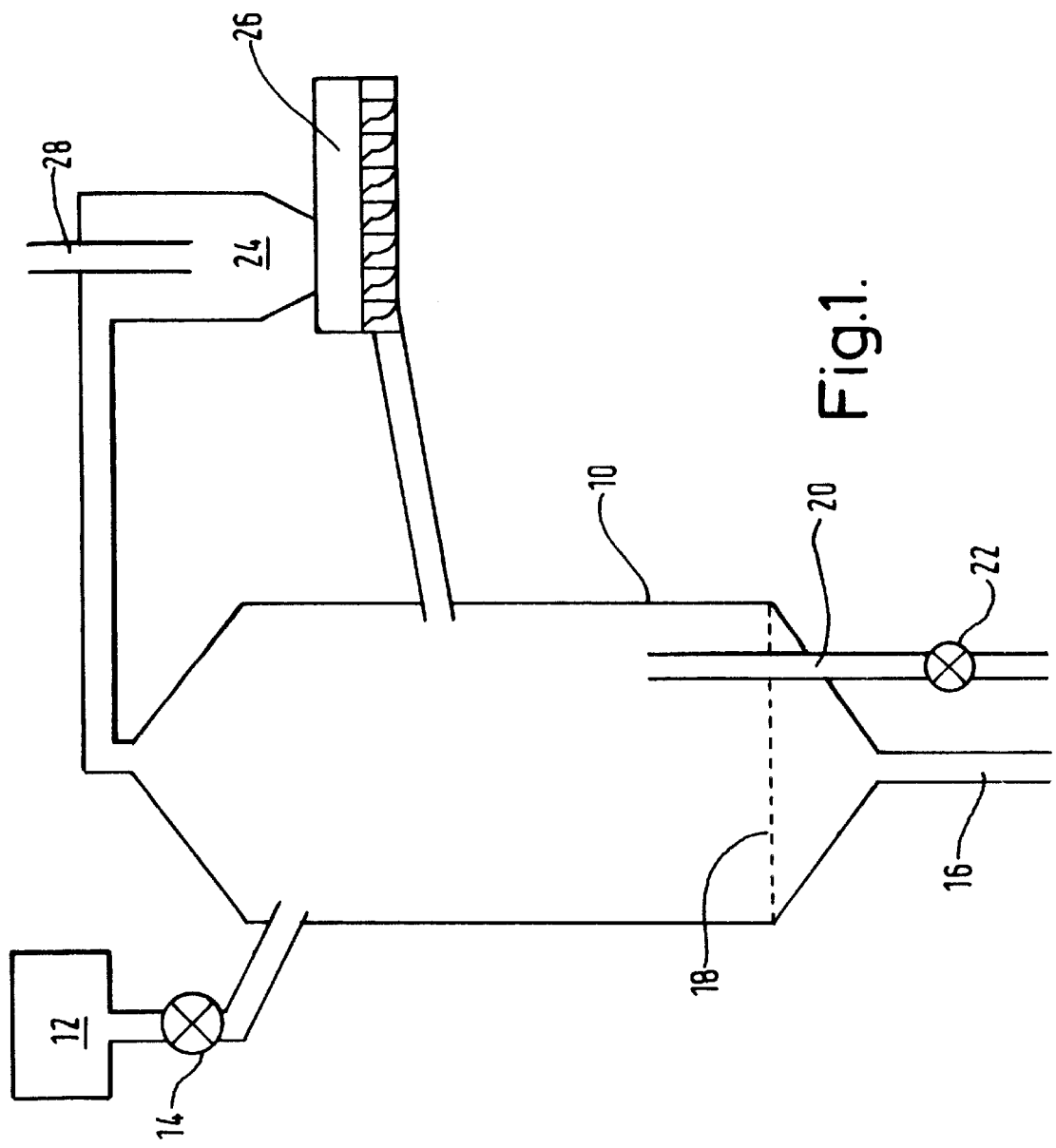
FIG. 1 schematically depicts a fluidized bed dryer suitable for practicing the inventive process.

The process can be conducted in apparatus such as that schematically illustrated in FIG. 1. Sodium borohydride dihydrate particles are fed into a fluidized bed dryer 10 from a feed bin 12 under the control of a flow regulating device 14. A low moisture content drying gas is fed through inlet 16 to flow upwardly through the dryer. The gas is distributed throughout the cross-section of the dryer by a porous distribution plate, or screen, 18, which also maintains the particulate charge on the upper side of the plate. The dried particles are removed from the dryer through an overflow pipe 20 under the control of flow regulation means 22. The stream of gas is removed from the dryer through a gas-solid separation device, such as a cyclone, 24. As the flowing gas stream enters the upper portion of the cyclone a whirling action is induced therein causing the fluidized solids to separate from the gas and settle downward along the wall, eventually flowing into the main chamber of the dryer through a flow control means, such as auger 26. The remaining gas stream is removed from the dryer/cyclone through the exhaust pipe 28.

The drying gas can generally be any gas which does not react with or cause decomposition of the borohydride. While a wide range of gases are functional as a drying/fluidizing media, gases which are relatively inexpensive, are not inherently hazardous, are otherwise environmentally acceptable and are readily recycled are preferred. Such preferred gases include nitrogen, and inert gases, such as helium, argon, neon, etc. Dehumidified air may also be used, however, it is particularly important that adequate safeguards against ignition sources and sodium borohydride decomposition be in place when air is used as the drying gas. The particularly preferred gas is nitrogen. It is important that during the final stages of drying, the water content of the gas being introduced to the dryer is controlled to a relatively low dew point of less than approximately −18° C. (0° F., 5.5 grains water per pound of dry air) and, preferably, a dew point of less than approximately −23° C. (−10° F., 3.2 grains water per pound of dry air). During the initial drying stages the drying gas can be introduced at a higher moisture content, a dew point of −4° C. (25° F.) or lower.

The temperature of the fluidized bed is controlled so as to not exceed 31° C. during the early stages of the drying process. As the drying process proceeds and the concentration of the dihydrate in the fluidized bed is reduced, the temperature of the bed can be increased to a temperature between 40° and 65° C., preferably, a temperature of approximately 60° C. If the drying operation is conducted as a batch process, the bed is initially maintained at a temperature of less than 31° C. until approximately 70 to 75% of the dihydrate has been converted to the borohydride, at which time the temperature of the bed can be increased to approximately 48° C. The temperature can be incrementally increased to a final temperature of approximately 65° C. as the dihydrate is further converted to borohydride. If the drying operation is conducted as a continuous operation wherein the solids progress through a plurality of stages or separate fluidized beds, the initial stage(s) should be maintained at a temperature not in excess of 31° C., while those stages wherein approximately 75% or more of the dihydrate has been converted can be operated at successively higher temperatures between 45° C. and 65° C.

The sodium borohydride dihydrate particles fed to the dryer may be provided from virtually any source of reasonably pure particles. We have principally used crystals recovered from an extraction liquid, such as isopropylamine, as described in U.S. Pat. No. 3,795,491. The particles fed to our process correspond to the crystals recovered from the centrifuge in the process of the noted patent.

Figure 2:
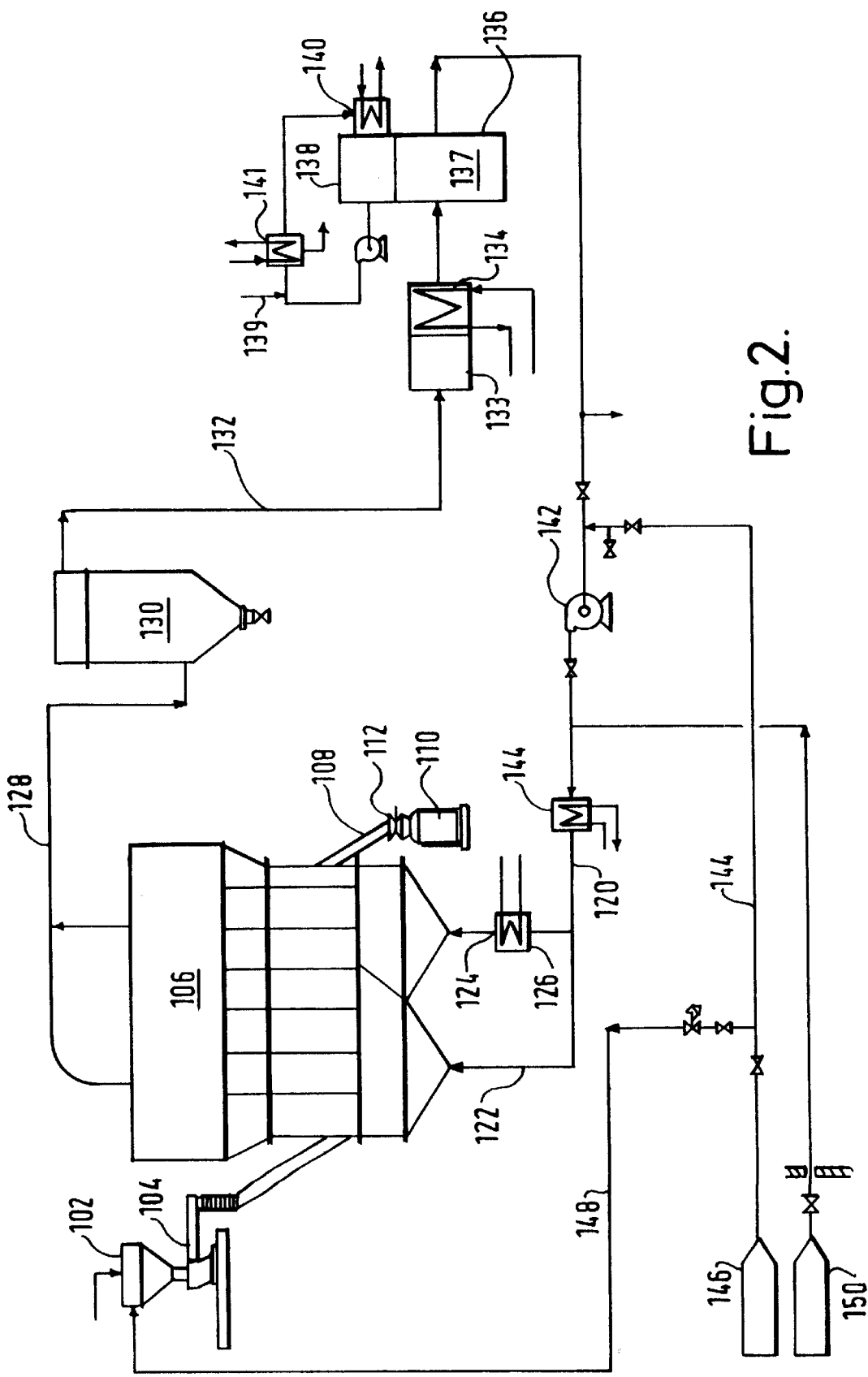
FIG. 2 schematically illustrates a further fluidized bed dryer and associated apparatus suitable for practicing the inventive process.

A preferred continuous flow embodiment of our drying process is schematically illustrated in FIG. 2. Dihydrate particles can be fed directly from a blender or a centrifuge or they can be fed from a storage hopper 102, from which they are fed through a flow regulating device, such as an auger 104 or a vibratory feeder, to a fluidized bed dryer 106. In the fluidized bed dryer 106, the particles are progressively dehydrated as they progress through a series of stages, seven stages being illustrated in the dryer 106.

The stages can be separated by baffles or weirs, or they can comprise separate vessels, as would be apparent to workers in the art. A chemically inert drying gas, nitrogen being the preferred gas depicted in this embodiment, is provided to fluidize and dry the particles as they progress through the dryer 106. Dried sodium borohydride product is removed from the final stage through a downflowing pipe 108 to a product receiving container 110 under the control of a flow regulating means, such as valve, 112.

Nitrogen is fed to the fluidized bed dryer 106 from the input nitrogen manifold 120 through two inlet ducts 122 and 124. The fluidized bed dryer 106 is designed so that the nitrogen fed through inlet duct 122 fluidizes and dehydrates particles in the first four stages of the dryer, while nitrogen fed through inlet duct 124 fluidizes and dehydrates particles in the final three stages of the dryer 106. A heat exchanger 126 supplied with a heating media, such as steam, is provided to adjust the temperature of the nitrogen fed through inlet pipe 124, whereby the final stages of drying in the fluidized bed are conducted at a higher temperature than provided in the initial stages. Alternatively, separate inlet ducts with separately controlled heat exchangers could be provided at each stage to provide multiple temperature zones in the dryer. Nitrogen removed from the fluidized bed is directed through an exhaust manifold 128 to a dust separation device, such as the illustrated cyclone 130 or, alternatively, a dust filter, wherein the majority of solid particles entrained in the flowing nitrogen are separated therefrom. The separated dust may be returned to the fluidized bed dryer 106 directly, or after being agglomerated, or it may be returned to a stage of the preceding solvent extraction process, or it may be recovered and processed as an alternative product. The partially cleaned nitrogen flows through conduit 132 to a filter 133 which further removes solid particles. The nitrogen stream then flows through a heat exchanger 134, supplied with a cooling media, such as cold water, wherein it is cooled to the optimal temperature for the succeeding desiccant treatment. The nitrogen then passes to a desiccant system 136 comprising a drying zone 137 and a regeneration zone 138. As the nitrogen passes through the drying zone 137 it contacts a desiccant, such as silica gel, titanium gel, lithium chloride or a molecular sieve, resulting in the removal of water therefrom. A portion of the desiccant is continuously cycled to the regeneration zone 138, where it contacts a relatively dry, hot regeneration gas causing it to substantially release the moisture which became associated with it in the drying zone 137. The regeneration gas can be formed from a portion of the dried nitrogen stream leaving the drying zone 137 or it can be recycled continuously in a closed loop with make up introduced through inlet 139. The regeneration gas is heated in heat exchanger 140 before being passed through the desiccant being regenerated. It is generally cost effective to recycle at least the major portion of the regeneration gas by passing it through a condenser 141 where it is chilled to condense and remove water therefrom, and then returned to the regeneration zone 138 through the heat exchanger 140. The main portion of the dried nitrogen stream is then pressurized by blower 142 and temperature conditioned by heat exchanger 144 before being directed through the fluidized bed dryer 106. The nitrogen is initially supplied via a conduit 144 connected from a source of nitrogen 146 to the nitrogen recirculation loop prior to blower 142. A separate line 148 from conduit 144 provides nitrogen to blanket the feed dihydrate particles in hopper 102. A separate remote source of pressurized nitrogen 150 is operatively connected to the nitrogen recirculation loop to provide nitrogen in the event of a major nitrogen leak or other emergency developing in that loop.

The temperature of nitrogen fed through inlet manifold 120 and inlet duct 122 is controlled to provide a bed temperature of 25° C. to 31° C., preferably approximately 31° C.; while the temperature of nitrogen fed through inlet duct 124 is controlled to provide a bed temperature within the range of 32° C. to 65° C., preferably approximately 60° C. The nitrogen provided in inlet manifold 120 has a dew point of less than −18° C., preferably, less than −23° C. Any quantity of nitrogen which is capable of fluidizing the solid particles in the fluidized bed may be used; we prefer an apparent nitrogen velocity of 100 to 150 feet/minute, and particularly, a velocity of approximately 135 feet/minute.

An alternative embodiment introduces the drying gas to the final drying stage at a dew point of less than −18° C, preferably less than −23° C., and a temperature in the range of 32° C to 65° C. The gas removed from the final stage is then cooled to a temperature of 31° C. or less in a chiller and fed to an initial drying stage at a dew point of less than −4° C. (25° F.). The gas removed from the initial drying stage is then processed in a manner similar to the gas collected in exhaust manifold 128 of the FIG. 2 embodiment.

The dried fluidized bed product can readily be pressed into more uniformly shaped compacts in order to provide uniform dissolution or reaction rates. Such compacts can be formed by standard briqueting or tableting techniques.

The dried sodium borohydride recovered from the fluidized bed dryer is a relatively odor-free, dust-free, highly reactive, readily dissolved, free-flowing powder; which, in contrast to previous sodium borohydride uncompacted products, does not require anti-caking or flow agents to retain its free-flowing character.

The unique properties are believed to result, in part, from the unique particle size and surface properties of the powder product. As demonstrated in the particle size distribution analysis reported in Table 1, the fluidized bed drying process typically provides a product wherein more than 80% by weight of the product, and, preferably, more than 90%, has a particle size between 10 and 60 mesh and less than 5% by weight of the particles will pass through a 60 mesh screen. Preferably, less than 2% of such product is smaller than 80 mesh.

TABLE 1

PARTICLE SIZE DISTRIBUTION

| −Sieve # | Fluidized Bed Dried Samples | | | Vacuum Dried Powder Samples | | Compacted Granule Samples | |
|---|---|---|---|---|---|---|---|
| | A | B | C | D | E | F | G |
| | % Retained | % Retained | % Retained | % Retained | % Retained | % Retained | % Retained |
| 10 | 0.0 | 0.1 | 0.1 | — | — | — | — |
| 20 | 19.9 | 34.0 | 20.3 | 1.7 | 1.0 | 51.6 | 40.8 |
| 30 | 42.9 | 33.0 | 36.7 | — | — | 27.8 | 29.6 |
| 40 | 33.8 | 20.2 | 37.1 | 1.9 | 3 | 10.8 | 25.5 |
| 50 | 4.2 | 7.1 | 5.2 | — | — | 2.1 | 3.6 |
| 60 | 0.3 | 1.1 | 0.1 | 2.1 | 1.9 | — | — |
| 80 | 0.2 | 1.5 | 0.2 | 51.4 | 1.1 | — | — |
| 100 | 0.1 | 0.9 | 0 | 0.4 | 11.9 | — | — |
| 200 | — | — | — | 32.6 | 71.5 | — | — |
| Bottom | 0.1 | 1.1 | 0.1 | 7.7 | 8.8 | 0.2 | 0.4 |

(The — symbol indicates that this sieve size was not used)

Dustiness has been referred to as the propensity of fine particles to become airborne and separate from the main portion of the bulk powder. Dust has been defined by a British Standard (BS 2995) as any particulate material finer than 75 microns. A 200 mesh sieve has a nominal sieve opening of 74 microns. The present fluidized bed product typically contains less than 0.25%, preferably less than 0.1%, by weight, of particles capable of passing through a 200 mesh screen. Previous uncompacted sodium borohydride vacuum dried products typically contain over 5% particles smaller than 200 mesh. The prior art granules of compacted vacuum dried powder typically contain 0.2% or greater amounts of particles smaller than 200 mesh.

The fluidized bed product has a bulk density (determined by weighing a known volume of the powder after lightly tapping the powder's container 100 times) between 20 and 28 lbs/ft$^3$, which is substantially less than the 32 to 37 lbs/ft$^3$ bulk density of either of the compacted granules or uncompacted powder vacuum dried product.

The fluidized bed product dissolves and reacts substantially faster than does the prior art compacted granulated product. For instance, after 3 grams of NaBH, product are vigorously agitated in 262 grams of 1-butanol at 5° C. for 15 minutes, analysis of the filtered supernatant indicated that 1.39 grams of the fluidized bed product (0.53 grams/100 grams of 1-butanol) had dissolved while 0.183 grams of the prior art granulated product (0.07 grams/100 grams of 1-butanol) had dissolved. Similar measurements after 60 minutes, established that 2.38 grams of the fluidized bed product had dissolved, while 1.28 grams of the granulated product had dissolved. The enhanced rate of dissolution of the fluidized bed dried product, as evidenced by its ability to dissolve more than 0.3% by weight in 1-butanol (0.3 grams in 100 grams of 1-butanol) at 5° C. in 15 minutes, is an important advantage over the prior art granules of compacted vacuum dried powder. The prior art vacuum dried powdered (not compacted) product dissolves and, in some cases, reacts faster than either the prior granulated product or the fluidized bed dried product of the present invention, however the powdered product has serious caking, flowability and dusting problems which require the addition of anti-caking compositions and a resultant decrease in product purity. The fluid bed dried product provides dissolution and reaction rates approaching those of the powdered product while avoiding the caking, flowability and dusting problems encountered with the powdered product.

Flowability of the different sodium borohydride forms has been compared by the Degussa method wherein the capability of approximately 50 gram samples of the various products to flow from glass funnels, through orifices of various sizes, is measured. One prior art powdered product which initially flowed through an 18 mm orifice would not run through the orifice after 2 weeks storage at constant 22°

C. and 48% relative humidity conditions. A further vacuum dried powdered product from a different source initially flowed through an 8 mm orifice when assisted by 2 taps of the funnel. After 2 weeks storage at the indicated conditions, 8 taps were required to cause it to discharge through the same sized orifice. Its flowability continued to deteriorate such that after 9 weeks at the indicated storage conditions, 2 taps of the funnel were required to cause it to flow through an 18 mm orifice. Lumps were observed in both of the powdered products. The prior art granulated, compressed vacuum dried product initially flowed through an 8 mm orifice without requiring tapping of the funnel. It maintained its flowability reasonably well over 9 weeks storage at the indicated conditions, when it required 3 taps of the funnel to cause it to flow through the 8 mm orifice. The fluid bed dried product of the present invention initially, and over the course of nine weeks storage at the indicated conditions, flowed through an 8 mm orifice with a single tap of the funnel. The same fluid bed dried product also flowed through a 5 mm orifice when assisted by 5 to 8 taps in 5 tests run initially, and after 2, 4, 5 and 9 weeks storage at the indicated conditions.

When observed under magnification the present particles have a smooth glassy asymmetrical surface and an opalescent appearance. The prior art powder particles are somewhat irregular in appearance and are smaller than the fluid bed dried particles. The compacted granular particles are generally somewhat larger than the fluidized bed dried particles and appear to be an aggregation of the smaller powder particles.

Since the present product retains its free flowing characteristic without the need for anti-caking or flow agents, it can be produced, packaged, stored, shipped and used in a purer form than was possible with the uncompacted powder product of previous drying techniques. The present product can be produced, stored and shipped as an additive free, free-flowing powder comprising at least 98.5% sodium borohydride, and preferably comprising at least 99% sodium borohydride. Moreover, the relatively small content of dust (i.e. particles smaller than 200 microns} results in a more environmentally friendly product to handle, store and use. The present products more rapid dissolution (than the prior art compacted granules) provides a further economic advantage since it permits faster processing and the use of smaller, less expensive apparatus.

The preceding description has been provided in detail to enable workers in the art to make, practice and use the invention. Workers in the art will appreciate that modifications can be made to the described invention without departing from its spirit. Therefore, it is not intended that the scope of the invention be limited to the specific embodiments described and illustrated. Instead, it is intended that the scope of the invention be defined by the following claims and their equivalents.

We claim:

1. A method of preparing sodium borohydride from sodium borohydride dehydrate particles comprising:
   providing a drying gas which is capable of removing water from said particles,
   flowing a stream of said drying gas around a plurality of said sodium borohydride dihydrate particles until said particles are converted to sodium borohydride; wherein said particles are fluidized in said stream of drying gas.

2. The method of claim 1 wherein said drying gas initially has a dew point of less than −18° C.

3. The method of claim 1 wherein said drying gas is selected from the group consisting of helium, argon, neon, nitrogen and air.

4. The method of claim 1 wherein said drying gas is nitrogen.

5. The method of claim 1 wherein said stream of drying gas contacts said plurality of particles at a temperature of 31° C or less.

6. The method of claim 1 wherein said particles initially contact said drying gas at a temperature up to 31° C. and after they have been partially converted to sodium borohydride said particles contact said drying gas at a temperature in excess of 31° C.

7. The method of claim 1 including:
   recovering said drying gas after it flows around said plurality of particles,
   dehydrating said recovered drying gas by removing water therefrom, and
   recycling said dehydrated drying gas to further contact a plurality of particles of sodium borohydride dihydrate.

8. The method of claim 7 wherein:
   said dehydrating comprises contacting said recovered drying gas with a desiccant capable of absorbing water from said recovered drying gas.

9. A method of drying sodium borohydride dihydrate particles comprising:
   providing a plurality of said particles,
   flowing nitrogen through said plurality of particles until at least the major portion of said particles have been converted to sodium borohydride; wherein said nitrogen flows through said plurality of particles at a sufficient velocity to suspend said particles in said nitrogen.

10. The method of claim 9, wherein said nitrogen is provided at a temperature of up to 31° C.

11. The method of claim 9, comprising:
    contacting said plurality of particles with said flowing nitrogen at a first temperature of up to 31° C. until a portion of said particles have been converted to sodium borohydride, and subsequently
    further contacting said plurality of particles with said flowing nitrogen at a second temperature in excess of 31° C.

12. The method of claim 11 wherein said second temperature is in the range of 32° C. to 65° C.

13. The method of claim 9 further comprising:
    recovering said nitrogen after it flows through said plurality of particles,
    dehydrating said recovered nitrogen by removing water therefrom, and
    recycling said dehydrated nitrogen to further contact with a plurality of said particles.

14. The method of claim 13 wherein said step of dehydrating comprises
    contacting said recovered nitrogen with a desiccant capable of absorbing water from said recovered nitrogen.

15. The method of claim 14 wherein said desiccant is selected from the group consisting of silica gel, titanium gel, lithium chloride or molecular sieve.

16. The method of claim 9 wherein:
    said sodium borohydride dihydrate particles are substantially continuously introduced to said flowing nitrogen, and
    substantially continuously withdrawing said converted sodium borohydride particles from said flowing nitrogen.

17. The method of claim 9 wherein said nitrogen is provided at a dew point of less than −18° C.

18. The product of the process of claim 9.

19. A free flowing plurality of sodium borohydride particles having a bulk density between 20 and 28 pounds per cubic foot and wherein at least 80% by weight of said particles pass through a 10 mesh screen and are retained on a 60 mesh screen and said plurality of sodium borohydride particles is capable of dissolving in stirred 1-butanol at 5° C. to form a concentration of sodium borohydride of at least 0.3% by weight in 15 minutes or less.

20. The free-flowing plurality of particles of claim 19 which is free of any flow additives.

21. The plurality of particles of claim 19 wherein at least 98.5% by weight is sodium borohydride.

22. A plurality of particles according to claim 19 wherein less than 5% by weight of the particles pass through a 60 mesh screen.

23. A plurality of particles according to claim 19 wherein less than 0.25% by weight of the particles are capable of passing through a 200 mesh screen.

24. A plurality of particles according to claim 19 wherein a said particles have a smooth, opalescent surface.

25. A plurality of particles according to claim 19 which is capable of substantially retaining its original capacity to flow freely after 9 weeks storage at 22° C. and 48% relative humidity.

26. A free-flowing plurality of sodium borohydride particles wherein at least 90% by weight of said particles pass through a 10 mesh screen and are retained on a 60 mesh screen and less than 0.25% by weight are capable of passing through a 200 mesh screen, and which is capable of dissolving in stirred 1-butanol at 5° C. to form a concentration of sodium borohydride of at least 0.3% by weight in 15 minutes or less.

* * * * *